United States Patent [19]
Hagen

[11] 3,906,230
[45] Sept. 16, 1975

[54] CHARGED PARTICLE DETECTOR

[76] Inventor: Richard D. Hagen, 105 W. Pawley Rd., Oak Ridge, Tenn. 37830

[22] Filed: Apr. 3, 1974

[21] Appl. No.: 457,443

[52] U.S. Cl. .................. 250/336; 250/377; 250/399
[51] Int. Cl. .............................................. G01t 1/16
[58] Field of Search............ 310/3 D, 3 C; 250/336, 250/377, 389, 399

[56] References Cited
UNITED STATES PATENTS

| | | | |
|---|---|---|---|
| 2,668,245 | 2/1954 | Rich.................................... | 250/377 |
| 2,831,988 | 4/1958 | Morel.................................. | 310/3 R |
| 3,067,331 | 12/1962 | Hess et al. .......................... | 310/3 D |

Primary Examiner—Harold A. Dixon
Attorney, Agent, or Firm—John R. Walker, III

[57] ABSTRACT

A device for detecting the emission of charged particles from a specimen. The specimen is placed within an accumulator means which statically accumulates any charged particles emitted from the specimen. The accumulator means is pivotally positioned between a first capacitor plate having a positive electrical charge and a second capacitor plate having a negative electrical charge. The accumulator means is attracted to one capacitor plate and repelled from the other capacitor plate by an amount proportional to the amount and intensity of charged particles emitted by the specimen.

11 Claims, 1 Drawing Figure

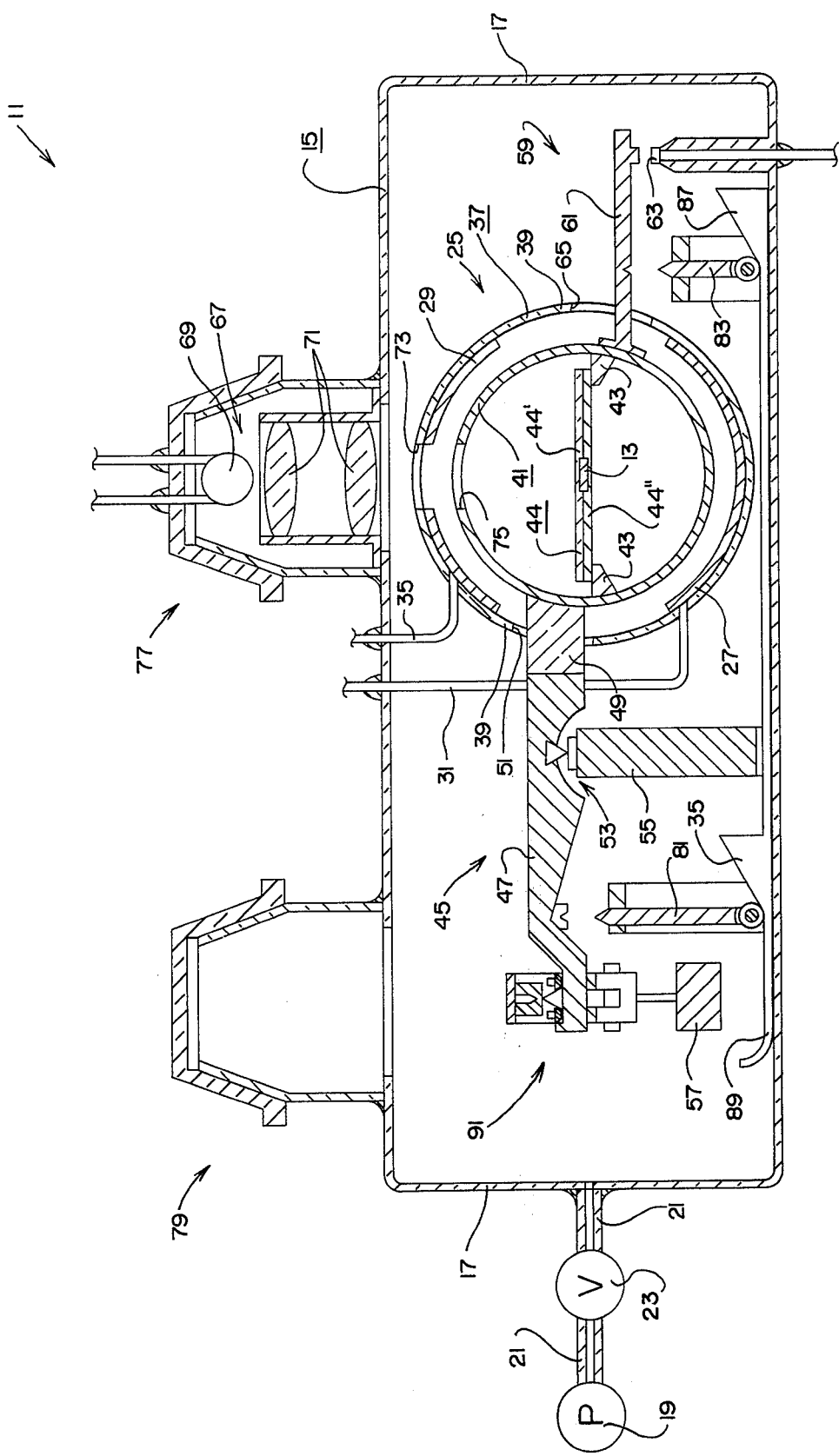

CHARGED PARTICLE DETECTOR

BACKGROUND OF THE INVENTION

1. Field of the Invention

This invention relates generally to devices for detecting whether a specimen is emitting charged particles.

2. Description of the Prior Art

Various means have been used to detect the emission of charged particles from a specimen. Geiger counters, Wilson cloud chambers, and scintillation counters are examples of such means well known to those skilled in the art. More specifically, the Geiger counter consists of a thin walled glass tube, containing two electrodes and a gas at low pressure. A potential difference between the electrodes is maintained at a level that is just below that necessary for allowing current to pass between the two electrodes. When a charged particle passes through the glass tube, it ionizes the gas in the tube. This lowers the resistance of the gas between the two electrodes and allows current momentarily to pass therebetween.

The Wilson cloud chamber allows the path of a dynamic charged particle to be viewed. That is, the cloud chamber is provided with a gas saturated with water vapor. As the charged particle passes through the cloud chamber, it ionizes the gas. Water vapor condenses on these ions forming small droplets which may be viewed through the wall of the cloud chamber.

Dynamic alpha or beta particles produce a momentary flash of light when they strike a zinc sulfide screen. In a scintillation counter, a photomultiplier is used to cause the light coming from the zinc sulfide screen to create a potential difference in a capacitor. The value of the potential difference can be measured by well-known means. An oscilloscope is usually incorporated in the circuit for viewing the pulses produced as a result of the alpha or beta particles striking the zinc sulfide screen.

Johnston, U.S. Pat. No. 3,621,257 discloses a detector for beta particles having means for scattering the beta particles back into the detector when they dynamically pass through the detector from a beta radiation source thereby providing two chances for the detection of the beta particles passing through the detector.

Huth, U.S. Pat. No. 3,293,435 discloses a semiconductor charge multiplying radiation detector which is capable of detecting a large proportion of incident low-energy particles and of producing large signals to indicate such detection.

Larson, U.S. Pat. No. 3,124,683 discloses a radiographic film package for use in making radio graphs.

None of the above devices disclose or suggest the present invention. These prior devices are disadvantageous for a number of reasons. Primarily, these devices are disadvantageous in that they require dynamic movement of the charged particles in order for the particles to be detected. This disadvantage stems from the fact that unlike alpha particles, which are emitted from a given nucleus with one or a few definite velocities, beta particles are emitted with a continuous range of velocities, from zero up to a maximum which depends on the nature of the emitting nucleus. Thus, the prior devices that depend upon dynamic particles would be ineffective in detecting beta particles that are emitted with a velocity of or near to zero.

SUMMARY OF THE INVENTION

The present invention is directed towards overcoming the problems and disadvantages in previous devices for detecting whether a specimen is emitting charged particles. The concept of the present invention is to provide an accumulator means for statically accumulating any charged particles emitted from a specimen. The accumulator means is pivotally positioned between a first capacitor plate having a positive electrical charge and a second capacitor plate having a negative electrical charge. The accumulator means is attracted to the first capacitor plate and repelled from the second capacitor plate by an amount proportional to the amount and intensity of charged particles emitted by the specimen.

BRIEF DESCRIPTION OF THE DRAWING

The drawing shows a sectional view of the charged particle detector of the present invention.

DESCRIPTION OF THE PREFERRED EMBODIMENT

The detector 11 of the present invention is for use with a specimen 13 to detect whether the specimen is emitting charged particles. The detector 11 includes a hollow body 15 preferably made of a transparent material such as glass or the like. The body 15 includes end portions 17 and is capable of being made airtight. A vacuum pump 19 is attached to the body 15 through a tube 21 for pumping the air from the interior of the hollow body 15 to create a vacuum therein. The tube 21 is sealed to the body 15 to insure that the body 15 is airtight. More specifically, the seals are preferably made of the same glass as that of container 15 by means well known to those skilled in the art. A valve 23 is preferably positioned in the tube 21 intermediate the body 15 and the vacuum pump 19 to regulate the flow of air from the interior of the body 15 to the pump 19. The valve 23 may be of any well known type such as a petcock.

A capacitor means 25 is fixedly located in the interior of the hollow body 15. The capacitor means 25 includes a first capacitor plate 27 for storing a positive electrical charge and includes a second capacitor plate 29 for storing a negative electrical charge. That is, the first capacitor plate 27 is connected by a conductor 31 to the positive terminal of a source of direct electrical current such as a battery (not shown). Likewise, the second capacitor plate 29 is connected by a conductor 35 to the negative terminal of the battery. Preferably, the battery is located outside of the body 15 and the conductors 31, 35 pass through apertures in the body 15. It should be noted that the conductors 31, 35 are sealed by means of uranium glass to the body 15 where they pass through apertures in the body 15 to insure that the body 15 is airtight. The first capacitor plate 27 preferably comprises a bottom half of an electrically conductive hollow sphere. Likewise, the second capacitor plate 29 preferably comprises a top half of an electrically conductive sphere. More specifically, the capacitor means 25 includes a glass sphere 37. The first capacitor plate 27 consists of a coating of electrically conductive material such as aluminum on the bottom inside portion of the glass sphere 37. The second capacitor plate 29 consists of a coating of electrically conductive material such as aluminum on the top inside portion of the glass sphere 37. The first and second capacitor plates 27, 29 are spaced apart from one another so that they are insulated from one another. That is, the glass sphere 37 includes a midportion 39 between the edges of the first and second capacitor plates 27, 29 in which there is no coating of electrically conductive material.

An accumulator means 41 is positioned intermediate the first and second capacitor plates 27, 29 and adjacent the specimen 13 for statically accumulating any charged particles emitted by the specimen 13 so that the accumulator means 41 is attracted to the first capacitor plate 27 if the specimen 13 emits negatively charged particles and is attracted to the second capacitor plate 29 if the specimen emits positively charged particles. It should be noted that by varying the strength of the source of direct electric current, i.e., by varying the strength of the battery, the amount of charged particles required to cause the accumulator means 41 to be attracted to either the first or second capacitor plate 27, 29 is varied. That is, if the energy of the charged particles accumulated on the accumulator means 41 is weak, the attraction between the first or second capacitor plate 27, 29 and the accumulator means 41 can be increased by simply increasing the voltage on the first and second capacitor plates 27, 29 by increasing the strength of the battery. Preferably, the accumulator means 41 comprises an electrically conductive hollow sphere positioned within the glass sphere 37 of the capacitor means 25. Preferably, holding members 43 are located within the interior of the hollow sphere of the accumulator means 41 for holding the specimen 13 substantially in the center of the accumulator means 41. The specimen 13 is preferably mounted within a slide 44 which is supported upon the holding members 43. The slide 44 preferably includes a top portion 44' of glass and a bottom portion 44" of copper.

The detector 11 is provided with balance means 45 for pivotally balancing the accumulator means 41 an equal distance between the first and second capacitor plates 27, 29 when the accumulator means 41 is neither positively or negatively charged. The balance means 45 includes an arm portion 47 fixedly attached to the accumulator means 41 through an insulator portion 49. It should be noted that the glass sphere 37 is provided with an opening 51 to allow the arm portion 47 and insulator portion 49 of the balance means 45 to be attached to the accumulator means 41 therethrough. The balance means 45 is provided with a fulcrum 53 and a fulcrum support 55 attached to the body 15 for allowing pivoting movement of the arm portion 47. A counterweight 57 is provided on the end of the arm portion 47 opposite the accumulator means 41 for counterbalancing the weight of the accumulator means 41 and the specimen 13.

The detector 11 includes means 59 for removing the charged particles from the accumulator means 41 after the accumulator means 41 has moved toward either the first or second capacitor plates 27, 29 but before contact therebetween. More specifically, the means 59 includes a conductor member 61 fixedly attached to the accumulator means 41 and includes a ground member 63 extending from the interior of the body 15 to an electrical ground. The ground member 63 is sealed to the body 15 in the same manner as conductors 31, 35 to insure that the body 15 is airtight. Preferably, the conductor member 61 and ground member 63 are positioned in such a manner that when the accumulator means 41 is attracted towards the first capacitor plate 27, the conductor member 61 contacts the ground member 63 before the accumulator means 41 contacts the first capacitor plate 27 thereby causing the charged particles accumulated on the accumulator means 41 to pass to ground leaving the accumulator means 41 neither positively or negatively charged. However, it should be understood that the conductor member 61 and the ground member 63 could be positioned in such a manner that when the accumulator means 41 is attracted towards the second capacitor plate 29, the conductor member 61 contacts the ground member 63 before the accumulator member 41 contacts the second capacitor plate 29. It should be noted that the glass sphere 37 is preferably provided with an opening 65 for allowing the conductor member 61 to extend therethrough.

The detector 11 may include photoelectric means 67 for directing light against the specimen 13 to cause photoemission therefrom. The photoelectric means 67 includes in general a light source 69 such as a mercury vapor light. Lens members 71 may be included in the photoelectric means 67 for focusing the light from the light source 69 on the specimen 13. Also, filter members (not shown) may be included in the photoelectric means 67. It should be noted that the sphere 37 is provided with an opening 73 to allow the photoelectric light from the source 69 to pass therethrough. Likewise, the accumulator means 41 is provided with an opening 75 for allowing the photoelectric light from the light source 69 to pass therethrough and to be directed on the specimen 13. Additionally, the openings 73, 75 allow the specimen 13 to be inserted into the interior of the accumulator means 41. Also, when the detector 11 includes photoelectric means 67, the accumulator means 41 and the bottom portion 44" of the slide 44 are preferably provided with a copper oxide coating to reduce photoemission therefrom.

The body 15 is preferably provided with an airtight first access means 77 for allowing the specimen 13 to be placed in the accumulator means 41 and for allowing access to the photoelectric means 67. Additionally, the body 15 preferably includes an airtight second access means 79 for allowing access to the counterweight 57 so that the counterweight 57 may be adjusted to balance the accumulator means 41 equal distance between the first and second capacitor plates 27, 29 when the accumulator means 41 is neither positively or negatively charged. The first and second access means 77, 79 are sealed to the body 15 in the same manner as the tube 21 to insure that the body 15 is airtight. Stabilizing means may be provided to stabilize the balance means 45 and accumulator means 41 when the counterweight 57 is being adjusted to balance the accumulator means 41. The stabilizing means 81 preferably includes first and second lift arms 81, 83 for selectively lifting the balance means 45 and accumulator means 41 from the fulcrum support 55 and holding the balance means 45 and accumulator means 41 in a stabilized, nonpivoting position. The first and second lift arms 81, 83 are selectively activated by first and second inclined planes 85, 87 which are in turn manually activated by a slide member 89.

The detector 11 may include scale means 91 for allowing the amount of deflection of the accumulator means 41 towards either the first or second capacitor plate 27, 29 to be measured thereby allowing the number of and the intensity of the charged particles emitted by the specimen 13 to be determined.

The operation of the detector 11 of the present invention is as follows: First, the specimen 13 is placed within the slide 44. The specimen 13 may be of a radioactive substance that emits beta particles such as carbon 14, ruthenium$^{106}$, or krypton$^{85}$. Additionally, the specimen 13 may be of a photoelectric sensitive substance such as cesium or sodium. The slide 44 is then placed on the holding members 43 within the accumulator means 41. The vacuum pump 19 may be activated to draw off any alpha particles emitted by the specimen 13 since, unlike beta particles, alpha particles, being composed of doubly charged helium atoms, are gases and can be pumped. The vacuum pump 19 also creates a vacuum in the interior of the hollow body 15 to insulate any charged particles accumulated on the accumulator means 41.

Assuming first that the specimen 13 is of a radioactive substance that emits beta particles, the beta particles emitted by the specimen 13 will statically accumulate on the accumulator means 41 by the same principle used in a Van de Graff generator. The accumulator means 41 will be attracted towards the first capacitor plate 27 having a positive charge thereon since the beta particles are negatively charged.

Now, assuming that the specimen 13 is of a photoelectric sensitive substance, when the photoelectric light from the light source 69 strikes the specimen 13, the specimen 13 will emit negatively charged particles which will statically accumulate on the accumulator means 41 and which will deflect the accumulator means 41 towards the first capacitor plate 27 in the same manner as heretofore disclosed relative to beta particles.

In general, the detector 11 allows the amount and intensity of charged particles emitted from the specimen 13 to be determined by either of two methods. In one method, the amount and intensity of the charged particles emitted by the specimen 13 is determined by the amount of deflection of the accumulator means 41 as shown by the scale means 91. In the other method, the amount and intensity of the charged particles emitted by the specimen 13 is determined by the speed at which the accumulator means 41 causes the conductor member 61 to contact the ground member 63. That is, as a sufficient amount of charged particles accumulate on the accumulator means 41, the accumulator means 41 is deflected a sufficient amount to cause the conductor member 61 to contact the ground member 63 thereby causing the charged particles accumulated on the accumulator means 41 to be grounded. When this is done, the accumulator means 41 is then moved back to its balanced position by the counterweight 57. The cycle then starts anew. The frequency of the cycle is then used to determine the amount and intensity of charged particles being emitted by the specimen 13.

As thus constructed and operated, the present invention allows charged particles to statically accumulate on the accumulator means 41 so that nondynamic emission of charged particles from the specimen 13 can be detected.

Although the invention has been described and illustrated with respect to a preferred embodiment thereof, it is not to be so limited since changes and modifications may be made therein which are within the full intended scope of the invention.

I claim:

1. Detector means for use with a specimen to detect whether the specimen is emitting charged particles, said detector means comprising:
   a. capacitor means including a first capacitor plate for creating a positive Coulombs field and including a second capacitor plate for creating a negative Coulombs field;
   b. accumulator means positioned intermediate said first and second capacitor plates and adjacent the specimen for statically accumulating any charged particles emitted by the specimen so that said accumulator means is attracted to said first capacitor plate if the specimen emits negatively charged particles and is attracted to said second capacitor plate if the specimen emits positively charged particles; and
   c. means for pivotally balancing said accumulator means between said first and second capacitor plates when said accumulator means is neither positively or negatively charged.

2. The detector means of claim 1 in which said accumulator means comprises an electrically conductive hollow sphere; in which said first capacitor plate comprises a bottom half of an electrically conductive hollow sphere and said second capacitor plate comprises a top half of an electrically conductive sphere; and in which is included holding members located in the interior of said accumulator means for holding the specimen substantially in the center of the interior of said accumulator means.

3. The detector means of claim 2 in which is included means for removing the charged particles from said accumulator means after said accumulator means has moved toward said capacitor means but before contact therebetween to cause cycling of said accumulator means by a rate proportional to the amount of charged particles emitted by the specimen to allow the number of charged particles emitted by the specimen to be determined.

4. The detector means of claim 3 in which is included photoelectric light means for directing light onto the specimen to cause photoemission therefrom.

5. The detector means of claim 2 in which is included scale means for coacting with said accumulator means when said accumulator means is attracted towards said capacitor means to allow the number of charged particles emitted by the specimen to be determined.

6. Beta particle detector means for use with a specimen to detect whether the specimen is emitting beta particles, said beta particle detector means comprising:
   a. capacitor means including a first capacitor plate for creating a positive Coulombs field and including a second capacitor plate for creating a negative Coulombs field;
   b. accumulator means positioned intermediate said first and second capacitor plates and adjacent the specimen for statically accumulating any beta particles emitted by the specimen so that said accumulator means is attracted to said first capacitor plate and repelled from said second capacitor plate an amount proportional to the amount of beta particles emitted by the specimen; and
   c. means for pivotally balancing said accumulator means equal distance between said first and second capacitor plates when said accumulator means is neither positively or negatively charged.

7. The beta particle detector means of claim 6 in which said accumulator means comprises an electrically conductive hollow sphere; in which said first capacitor plate comprises a bottom half of an electrically conductive hollow sphere and said second capacitor plate comprises a top half of an electrically conductive hollow sphere; and in which is included holding members located in the interior of said accumulator means for holding the specimen substantially in the center of the interior of said accumulator means.

8. The beta particle detector means of claim 7 in which is included means for removing the beta particles from said accumulator means after said accumulator means has moved toward said first capacitor plate but before contact therebetween to cause cycling of said accumulator means by a rate proportional to the amount of beta particles emitted by the specimen to allow the number of beta particles emitted by the specimen to be determined.

9. The beta particle detector means of claim 8 in which is included photoelectric light means for directing light onto the specimen to cause photoemission therefrom.

10. The beta particle detector means of claim 7 in which is included scale means for coacting with said accumulator means when said accumulator means is attracted towards said first capacitor plate to allow the number of beta particles emitted by the specimen to be determined.

11. Beta particle detector means for use with a specimen to detect whether the specimen is emitting beta particles, said beta particle detector means comprising:
   a. capacitor means for storing an electrical charge, said capacitor means including a first capacitor plate comprising a bottom half of an electrically conductive hollow sphere for storing a positive electrical charge and including a second capacitor plate comprising a top half of an electrically conductive hollow sphere for storing a negative electrical charge, said first and second capacitor plates being spaced apart and insulated from one another;
   b. accumulator means positioned intermediate said first and second capacitor plates and adjacent the specimen for statically accumulating any beta particles emitted by the specimen so that said accumulator means is attracted to said first capacitor plate and repelled from said second capacitor plate an amount proportional to the amount of beta particles emitted by the specimen, said accumulator means comprising an electrically conductive hollow sphere;
   c. holding means located in the interior of said accumulator means for holding the specimen substantially in the center of the interior of the accumulator means;
   d. means for pivotally balancing said accumulator means equal distance between said first and second capacitor plates when said accumulator means is neither positively or negatively charged;
   e. means for removing the beta particles from the accumulator means after said accumulator means has moved toward said first capacitor plate but before contact therebetween to cause cycling of said accumulator means by a rate proportional to the amount of beta particles emitted by the specimen to allow the number of beta particles emitted by the specimen to be determined; and
   f. photoelectric light means for directing light onto the specimen to cause photoemission therefrom.

* * * * *